Patented Dec. 30, 1930

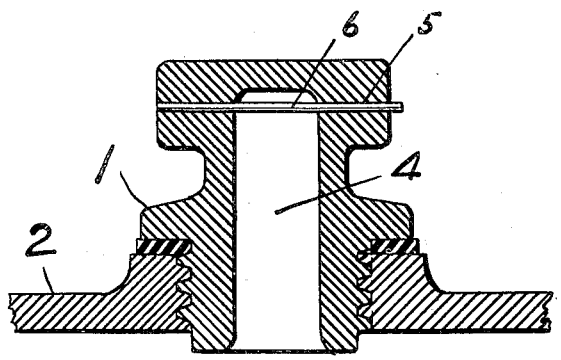
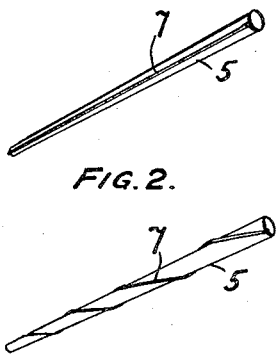
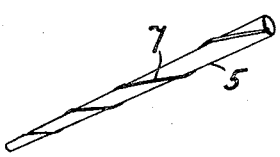
FIG. 1.  FIG. 2.  FIG. 3.
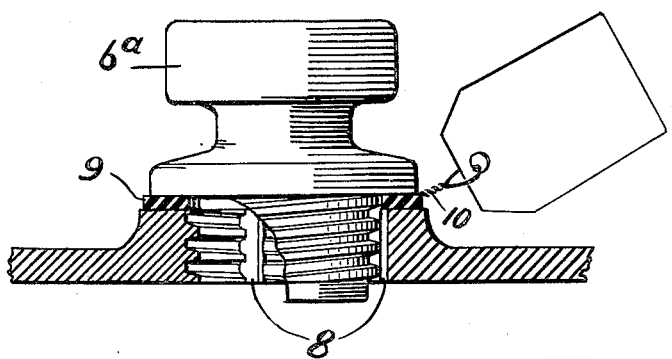
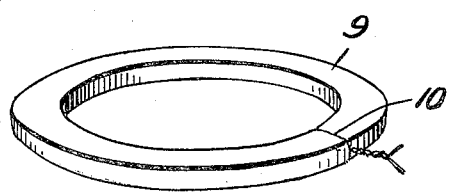
FIG. 4.  FIG. 5.

1,786,961

UNITED STATES PATENT OFFICE

GEORGE E. PETROSKY, OF PHILADELPHIA, PENNSYLVANIA

VENT FOR STORAGE BATTERIES

Application filed April 30, 1928. Serial No. 273,842.

My invention relates to a vent for a storage battery cell, in which cell the plates have been fully charged and from which the electrolyte has been removed, and one object of my invention is to provide a vent which will allow the escape of the gases which may be developed in the cell while standing on open circuit in a charged and dumped condition but will prevent or retard the diffusion of air into the cell.

It is known that when a battery of the lead acid type is standing on open circuit in a charged condition after the electrolyte has been removed, a certain amount of hydrogen gas will be developed in the cell due to the gradual combination between the active material of the negative plates and the acid remaining in the plates and in the wood separators. Due to the limited amount of acid in the cell after dumping, this effect is of minor importance and the plates will retain a very considerable proportion of their full charge for a long period of time provided they are kept from contact with the external air. If however air has free access to the plates in the presence of moisture, the active material of the negative plates will rapidly oxidize and the plates become discharged.

In accordance with my invention, I provide a vent which is simple and inexpensive and is readily applied and is so designed that a vent duct of the proper proportions to obtain the desired results will reliably be provided.

This invention is an improvement on the invention disclosed in Patent No. 1,758,545 to C. C. Wallace, which was co-pending herewith.

In the following description reference will be made to the accompanying drawing forming part hereof and in which Figure 1 is a sectional elevation of a vent plug embodying features of the invention.

Fig. 2 is a perspective view to an enlarged scale of one of the parts shown in Fig. 1.

Fig. 3 is a similar view illustrating a modification of the parts shown in Fig. 2.

Fig. 4 is a sectional elevation of a vent plug embodying a modification of the invention, and Fig. 5 is a perspective view illustrating one of the parts shown in Fig. 4 to an enlarged scale.

Referring to Figure 1, 1 is a vent plug of conventional form adapted to be screwed into a threaded opening of the cover 2 of a storage cell. The plug is provided with an internal cavity 4 communicating at the bottom with the interior of the cell and at the top with the external air through a horizontal duct 5, which may be a hole drilled horizontally through the top of the plug. This hole is of sufficient diameter to permit the escape of gas during the end of a normal charge but is too large to prevent rapid diffusion of air into the interior of the cell when the cell is standing on open circuit in a charged and dumped condition. To prevent such diffusion under these conditions, I have shown inserted in this hole 5 a cylindrical piece of rubber 6 of suitable diameter to completely fill the hole 5. This strip may be in the form of a tube or may be solid. If this strip of rubber is made sufficiently tight in the hole, it will effectually seal the opening and permit excessive pressure to be developed in the cell by the evolution of gas from the plates. It is somewhat difficult to provide a strip of rubber of exactly the right diameter to give a sufficiently loose fit to relieve this pressure and at the same time restrict the passage afforded between the interior wall of the hole 5 and the exterior surface of the rubber strip sufficiently to prevent the air from diffusing into the interior of the cell at an excessive rate. To overcome this difficulty, I provide a strip of rubber of sufficient diameter to make a tight fit in the hole but I insert along with the rubber strip a piece of fine wire 7, which may run substantially parallel to the axis of the rubber strip or if more convenient, it may make a few convolutions around the rubber strip. Since the rubber strip cannot fit around the wire to fill all of the space between the wire and the interior surface of the hole 5, there will always be left a capillary opening extending from the cavity 4 to the external air sufficient to relieve the pressure of gas developed in the cell but of so small a cross section as to prevent diffusion of air into the cell or to keep the rate of such diffusion down to a negligible amount.

In Figure 4, I have shown a vent plug $6^a$ of a somewhat different design, in which the body of the plug is solid and the normal vent for the escape of gas from the cell is provided by vertical ducts, 8, between the body of the plug and the wall of the vent opening in the cover. When the vent plug is first applied to the cell after the plates are fully charged and the electrolyte has been removed, a rubber gasket 9 is located under the shoulder of the vent plug, which completely closes the normal vent passage and would therefore permit excessive pressure to be developed by the evolution of gas in the cell. To avoid this, I have shown a fine wire 10 formed around the rubber gasket and providing for a capillary relief passage similar to that provided by the wire 7 shown in Figure 1.

When the cell is put into service, the plug $6^a$ is removed for filling the cell with electrolyte and the rubber gasket 9 is removed and discarded. Instructions to this effect are furnished on a tag attached to the wire 10, so that the latter serves the double purpose of providing a capillary release vent and a means for attaching the instruction tag.

When the plug 1 is inserted without the gasket 9 it is obvious that it should not, and one skilled in the art would not, screw it down far enough to stop up the vent ducts 8.

I claim:

1. Venting means for a storage battery cell in a charged and dumped condition having a passage for the escape of gases from the cell under operating conditions, a removable pliable member sealing said passage, and a fine wire inserted between contiguous surfaces of the passage and the pliable member to provide a minute vent from the interior to the exterior of the cell.

2. Venting means for a storage battery cell in a charged and dumped condition and having a cover with a vent opening for normal operation, comprising a vent plug provided with a shoulder adapted to seat on a gasket on the cover to close the vent opening, a pliable gasket between the shoulder and the cover, and a wire around the gasket adapted to provide a minute vent along said wire between the gasket and the abutting surfaces of the vent plug and cover.

GEORGE E. PETROSKY.